United States Patent
Bachelder et al.

(10) Patent No.: US 6,516,092 B1
(45) Date of Patent: Feb. 4, 2003

(54) ROBUST SUB-MODEL SHAPE-FINDER

(75) Inventors: Ivan A. Bachelder, Newton, MA (US); Yoshikazu Ohashi, Framingham, MA (US)

(73) Assignee: Cognex Corporation, Natick, MA (US)

(*) Notice: Subject to any disclaimer, the term of this patent is extended or adjusted under 35 U.S.C. 154(b) by 0 days.

(21) Appl. No.: 09/086,904

(22) Filed: May 29, 1998

(51) Int. Cl.[7] .......................... G09K 9/00; G06T 17/00
(52) U.S. Cl. ...................... 382/181; 382/173; 345/420
(58) Field of Search .................. 382/151, 154, 382/173, 195, 203, 286, 216, 181, 219, 177, 287; 345/419, 420, 421, 424, 435, 441, 442, 443; 257/690; 348/169

(56) References Cited

U.S. PATENT DOCUMENTS

| | | |
|---|---|---|
| 3,936,800 A | 2/1976 | Ejiri et al. |
| 4,115,702 A | 9/1978 | Nopper |
| 4,115,762 A | 9/1978 | Akiyama et al. |
| 4,183,013 A | 1/1980 | Agrawala et al. |
| 4,200,861 A | 4/1980 | Hubach et al. |
| 4,441,248 A | 4/1984 | Sherman et al. |
| 4,570,180 A | 2/1986 | Baier et al. |
| 4,685,143 A | 8/1987 | Choate |
| 4,688,088 A | 8/1987 | Hamazaki et al. |
| 4,736,437 A | 4/1988 | Sacks et al. |
| 4,763,280 A * | 8/1988 | Robinson et al. ........... 364/518 |
| 4,783,826 A | 11/1988 | Koso |
| 4,860,374 A | 8/1989 | Murakami et al. |
| 4,876,457 A | 10/1989 | Bose |
| 4,876,728 A | 10/1989 | Roth |
| 4,922,543 A | 5/1990 | Ahlbom et al. |
| 4,955,062 A | 9/1990 | Terui |
| 4,959,898 A | 10/1990 | Landman et al. |

(List continued on next page.)

FOREIGN PATENT DOCUMENTS

WO    WO 97/24693    7/1997

OTHER PUBLICATIONS

Ullman, Shimon, "Aligning pictorial descriptions: An approach to object recognition, I: approaches to Object Recognition," reprinted from *Cognition*, Aug. 1989, pp. 201–214, vol. 32, No. 3, Cambridge, MA, USA.

Cognex Corporation, "Chapter 7 Rectilinear Device Inspection," *Cognex 4000/5000 SMD Placement Guidance Package User's Manual*, 1996, pp. 269–310, Release 3.2 590–0139, Natick, MA, USA.

Cognex Corporation, "Chapter 11 Frontlit Chip Inspection," *Cognex 4000/5000 SMD Placement Guidance Package User's Manual*, 1996, pp. 357–372, Release 3.2 590–0139, Natick, MA, USA.

Medina–Mora, Raul, "An Incremental Programming Environment," *IEEE Transactions on Software Engineering*, Sep. 1981, pp. 472–482, vol. SE–7 No. 5, USA.

Hoogs et al., "Model–Based Learning of Segmentations", IEEE, pp. 494–499, 1996.

Newman et al., "3D CAD–Based Inspection I: Coarse Verification", IEEE, pp. 49–52, 1992.

*Primary Examiner*—Jose L. Couso
*Assistant Examiner*—Kanji Patel
(74) *Attorney, Agent, or Firm*—Russ Weinzimmer (57) ABSTRACT

A method is provided for efficiently finding a pattern in an image using a full curvilinear model having a plurality of sub-models. Generally, the method includes maximizing the percentage of each segment connected to each vertex of each sub-model, and finding the pattern in the image using the model so-constructed. The invention permits the rapid determination of characteristics, such as dimensions, position, and orientation, of rectilinear and other polygonal objects, and is particularly well-adapted for analyzing images of back-lit objects.

19 Claims, 7 Drawing Sheets

U.S. PATENT DOCUMENTS

| | | |
|---|---|---|
| 4,962,423 A | 10/1990 | Yamada et al. |
| 4,980,971 A | 1/1991 | Bartschat et al. |
| 5,060,276 A | 10/1991 | Morris et al. |
| 5,073,958 A | 12/1991 | Imme |
| 5,081,656 A | 1/1992 | Baker et al. |
| 5,081,689 A | 1/1992 | Meyer et al. |
| 5,086,478 A | 2/1992 | Kelly-Mahaffey et al. |
| 5,113,565 A | 5/1992 | Cipolla et al. |
| 5,133,022 A | 7/1992 | Weideman |
| 5,134,575 A | 7/1992 | Takagi |
| 5,153,925 A | 10/1992 | Tanioka et al. |
| 5,206,820 A | 4/1993 | Ammann et al. |
| 5,225,940 A | 7/1993 | Ishii et al. |
| 5,226,095 A | 7/1993 | Okumura et al. |
| 5,265,173 A | 11/1993 | Griffin et al. |
| 5,268,999 A | 12/1993 | Yokoyama |
| 5,273,040 A | 12/1993 | Apicella et al. |
| 5,343,028 A | 8/1994 | Figarella et al. |
| 5,371,690 A | 12/1994 | Engel et al. |
| 5,398,292 A | 3/1995 | Aoyama |
| 5,454,068 A * | 9/1995 | Ramanujam ................ 345/419 |
| 5,471,541 A | 11/1995 | Burtnyk et al. |
| 5,495,537 A | 2/1996 | Bedrosian et al. |
| 5,497,451 A | 3/1996 | Holmes |
| 5,500,906 A | 3/1996 | Picard et al. |
| 5,510,838 A * | 4/1996 | Yomdin et al. ............. 348/384 |
| 5,525,883 A | 6/1996 | Avitzour |
| 5,545,887 A | 8/1996 | Smith et al. |
| 5,602,937 A | 2/1997 | Bedrosian et al. |
| 5,621,807 A | 4/1997 | Eibert et al. |
| 5,625,715 A | 4/1997 | Trew et al. |
| 5,627,912 A | 5/1997 | Matsumoto |
| 5,627,915 A | 5/1997 | Rosser et al. |
| 5,663,809 A | 9/1997 | Miyaza et al. |
| 5,828,769 A | 10/1998 | Burns |
| 5,845,288 A | 12/1998 | Syeda-Mahmood |
| 5,850,469 A | 12/1998 | Martin et al. |
| 5,877,548 A * | 3/1999 | Washida et al. ............. 257/690 |
| 5,936,628 A * | 8/1999 | Kitamura et al. ........... 345/420 |
| 5,945,996 A * | 8/1999 | Migdal et al. ............. 345/420 |
| 5,974,169 A | 10/1999 | Bachelder |
| 5,978,576 A * | 11/1999 | Sanadidi et al. ............ 395/500 |
| 5,982,374 A * | 11/1999 | Wahl ......................... 345/419 |
| 6,172,679 B1 * | 1/2001 | Lim .......................... 345/421 |
| 6,178,262 B1 * | 1/2001 | Picard et al. ............... 382/195 |

* cited by examiner

Fig. 8

ROBUST SUB-MODEL SHAPE-FINDER

FIELD OF THE INVENTION

The invention pertains to machine vision and, more particularly, to methods for finding an object represented in an image, e.g., back-lit objects, such as semiconductor chips.

BACKGROUND OF THE INVENTION

Machine vision refers to the automated analysis of an image to determine characteristics of objects and other features shown therein. It is often employed in automated manufacturing lines, where images of components are analyzed to determine placement and alignment prior to assembly. Machine vision is also used for quality assurance. For example, in the pharmaceutical and food packing industries, images of packages are analyzed to insure that product labels, lot numbers, "freshness" dates, and the like, are properly positioned and legible.

In many machine vision applications, it is often essential to identify the boundaries of objects in images. In the semiconductor industry, for example, semiconductor chips must be precisely positioned and oriented before they can be soldered into place on a printed circuit board. Typically, those components are "back-lit," i.e., illuminated from behind such that images of only their silhouettes are presented for machine vision analysis.

The machine vision analysis of back-lit semiconductor chips can be difficult because the visual features (e.g., edge points) presented in their images must be matched to internal models of the components. This is necessary to permit determination of accurate transformations from model to physical coordinates (i.e., the physical position of the chip). The process must be fast, moreover, so that an automated surface mounter can inspect and place each device on the board quickly. It must also be accurate enough to insure that chip leads substantially contact pads on the board.

This problem may be complicated further by extraneous structures in the images. Like other delicate electronic components, semiconductor chips are typically manipulated during assembly by suction nozzles. The small vacuum tip of a suction nozzle is used to pick the chips out of bins, present them for inspection to the machine vision camera, and place them on boards. Although the nozzles are usually arranged to pick up the chips from behind, they sometimes cast shadows or protrude beyond the edges of the chips, resulting in silhouettes that interfere with determination of chip location, orientation, and other characteristics.

Other complications arise from the lighting conditions. Often, back-lighting will cause the otherwise rectangular chips to appear as if they have rounded corners. Image features extracted around these corner points do not accurately reflect the physical structure of the chip and, consequently, also confound location and inspection.

Still further, as with other manufactured devices, each chip has a slightly different size and shape. Although each chip must satisfy a set of manufacturing specifications, e.g., width and length tolerances, there is no guarantee that chip corners will be sharp, nor that edges will be completely straight.

It is therefore an object of this invention to provide improved machine vision methods and, particularly, improved methods for determining the location and other characteristics of an object in an image.

A further object is to provide such methods as permit the rapid determination of characteristics, such as dimensions, position, and orientation, of rectilinear and other polygonal objects.

Still another object is to provide such methods as can be adapted for use in analyzing images of back-lit objects.

Yet another object is to provide such methods as can be readily implemented on conventional digital data processors or other conventional machine vision analysis equipment.

Another object of the invention is to provide such methods that can rapidly analyze images without undue consumption of computational resources.

SUMMARY OF THE INVENTION

The invention is a method for finding a pattern in an image using a full curvilinear model having a plurality of sub-models. Each sub-model includes at least one vertex of the full model and at least a portion of each segment connected to each vertex. Generally, the method includes maximizing the percentage of each segment connected to each vertex, and finding the pattern in the image using the model so-constructed. Each sub-model can include exactly one vertex, or more than one vertex. In a preferred embodiment, maximizing the percentage of each segment connected to each vertex of a sub-model includes including the entirety of each segment. In an alternate preferred embodiment, maximizing the percentage of each segment connected to each vertex of a sub-model includes incorporating only and all of those portions of segments that lie outside a specified occlusion region. The specified occlusion region is enclosed by an occlusion boundary that is defined by an object profile. Alternatively, the specified occlusion region can be enclosed by an occlusion boundary that is based on empirical statistics and a threshold. In another preferred embodiment, maximizing the percentage of each segment connected to each vertex of a sub-model includes using only those portions of the segments that extend from a vertex to the boundary of an occlusion region.

In another embodiment of the invention, in a method for finding a pattern in an image using a full curvilinear model having a plurality of sub-models, each sub-model including a single vertex and a first and second segment connected thereto, the method includes: providing a model having at least two sub-models, where the two sub-models are in substantially overlapping relationship along most of a first segment of each of the two sub-models, and each of the two sub-models also each have a second segment that extends in non-overlapping relationship. In a preferred embodiment, a second segment extends so as not to extend into an occlusion region. The occlusion region can be enclosed by an occlusion boundary that is defined by an object profile. Alternatively, the occlusion region is enclosed by an occlusion boundary is based on empirical statistics and a threshold.

In another general embodiment of the invention, a method is provided for finding a pattern in an image using a model having a plurality of sub-models. The method includes providing a model having a plurality of sub-models, each sub-model including a first vertex and a second vertex, where a first segment connects the first vertex and the second vertex, a second segment extends from the first vertex, and a third segment extends from the second vertex, wherein the second segment extends so as not to extend into an occlusion region, and the third segment extends so as not to extend into an occlusion region. The pattern is then found in the image using the model. The occlusion region is enclosed by an occlusion boundary that is defined by an object profile. Alternatively, the occlusion region is enclosed by an occlusion boundary is based on empirical statistics and a threshold.

In another general aspect of the invention, a method is provided for finding a pattern in an image using a full curvilinear model having a plurality of sub-models. The method includes providing a model having a plurality of sub-models, each sub-model including a first vertex and a second vertex, a first segment connecting the first vertex and the second vertex, a second segment extending from the first vertex, and a third segment extending from the second vertex, the second segment extending so as not to include an occlusion region, and so as to include remaining portions of the second segment, and the third segment extending so as not include an occlusion region, and so as to include remaining portions of the third segment. Then, the pattern is found using the model.

BRIEF DESCRIPTION OF THE DRAWING

The invention will be more fully understood from the following detailed description, in conjunction with the following figures, wherein:

FIG. 4a is a representation of full model and a plurality of labels and corresponding percentages for creating sub-models based on the model of FIG. 2;

FIG. 4b is an example of a sub-model table and model storage for the labeled model of FIG. 4a;

FIGS. 5–8 are schematic representations of the stages of using the invention to find a rectangular image, such as an image of a semiconductor chip, that is complicated by also including a superimposed image of a second object, such as a typical pickup nozzle for pnumatically manipulating semi-conductor chips. The first illustration in each sequence shows the coarse part location (CPL) result of the shape-finder tool. The second shows the fine part location (FPL) sub-model results. The third illustration shows the remaining sub-models following the sub-model validation stage. The last shows the final pose result determined using the remaining (circled) corners found using the remaining sub-models, and measured dimension.

DETAILED DESCRIPTION OF THE PREFERRED EMBODIMENTS

Figure 1:
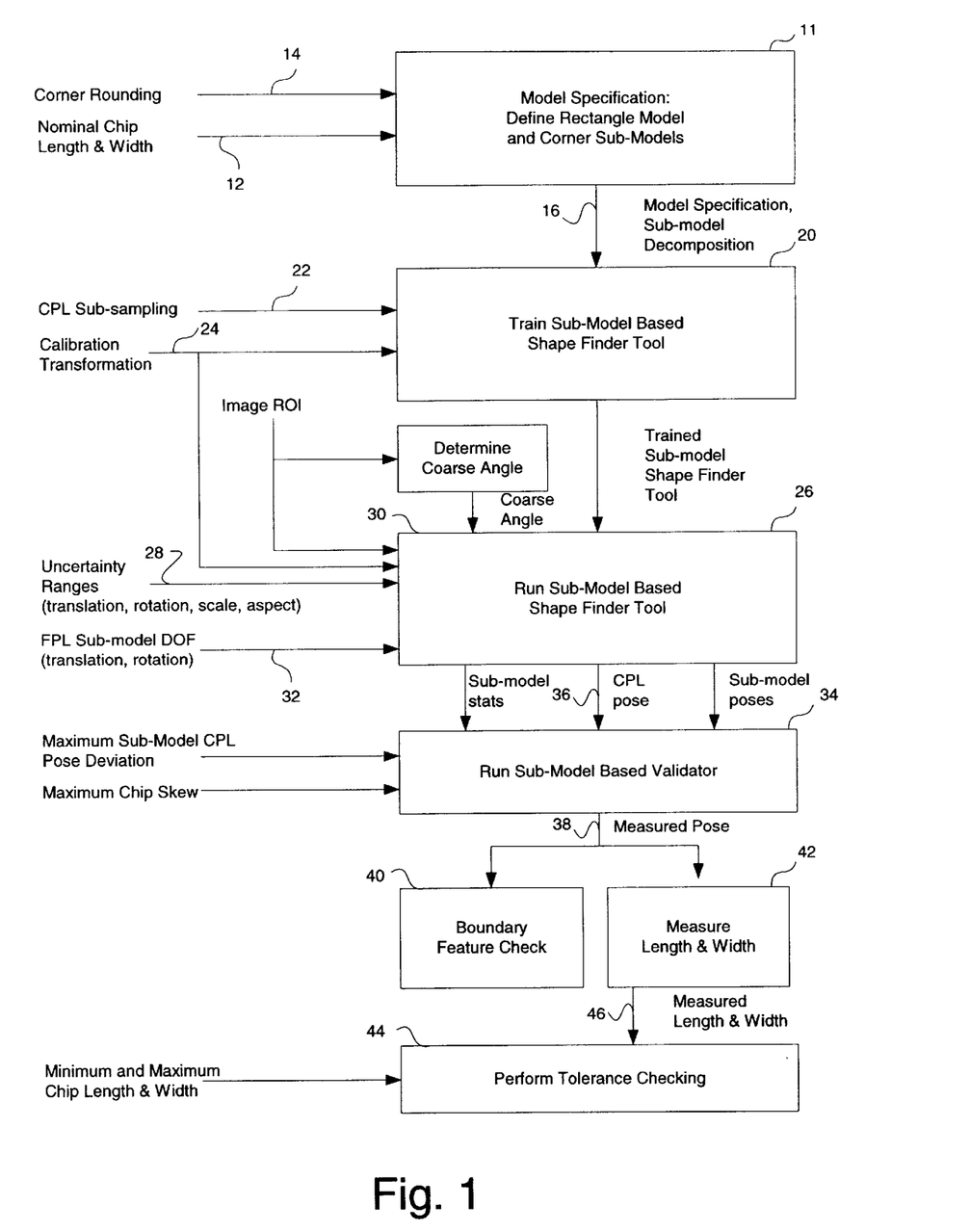
FIG. 1 is a flow chart of the functional organization of the invention and the use of the invention.
Figure 2:
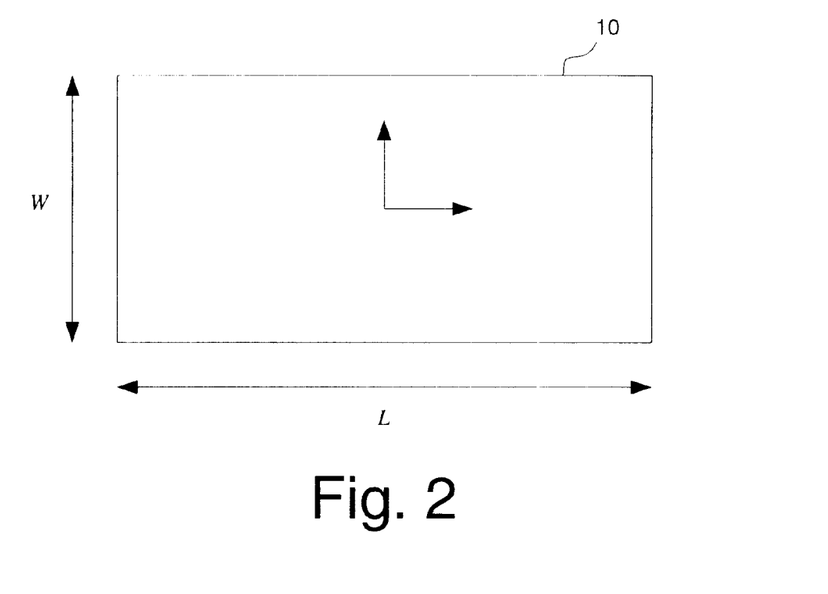
FIG. 2 is a representation of a full model.

With reference to FIGS. 1 and 2, to find an image of an object using the invention, a model 10 is first specified in step 11. More specifically, a geometric model 10 of an object to be found, such as a rectangular semiconductor "chip" is specified as a curvilinear shape with sub-models, as generally outlined in the co-pending patent application Ser. No. 09/054,968, filed Apr. 3, 1998. The full model 10 of the chip is defined, for example, as a rectangle (a closed polygon with four connected vertices) with the client-specified nominal length and width 12, and the client-specified corner rounding 14, as shown in FIGS. 1 and 2.

Figure 3:
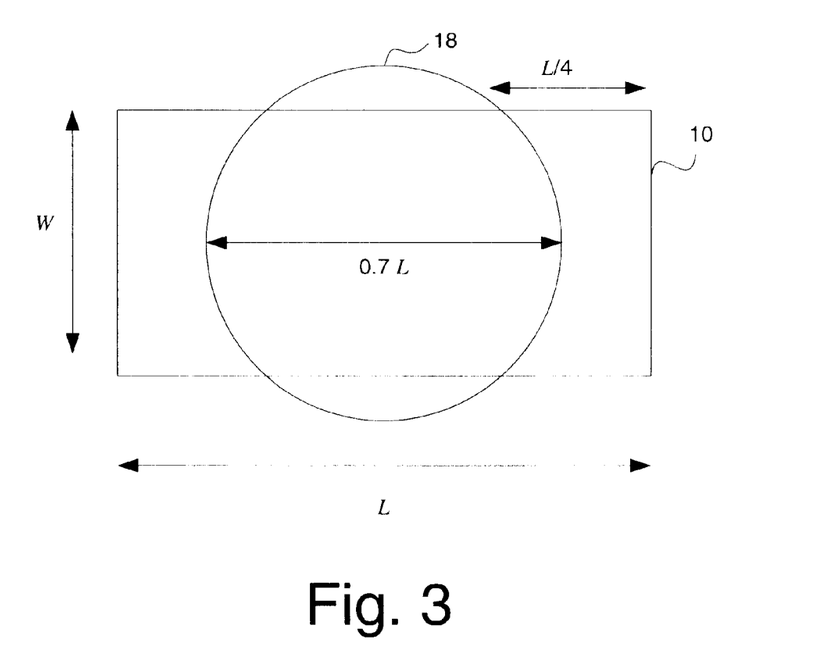
FIG. 3 is a representation of a full model with an occlusion region superimposed thereon.

The sub-model decomposition 16 of the full model is determined by labelling each vertex according to the sub-model to which it belongs, and then specifying the percentages of each segment contributing to a particular sub-model as follows:

First, an "occlusion region" 18 is determined. An occlusion region denotes those portions of the full model within which features are likely to be occluded, or missing, due to obstructions in the image (such as the superimposed image of a pickup nozzle). In a preferred embodiment, the occlusion region 18 is created by assuming that the nozzle center will nominally coincide with the geometric center of the chip, thereby forming a circular occlusion region about the center of the full model 10 with a diameter equal to the nominal nozzle diameter, as shown in FIG. 3.

Alternatively, the occlusion region can be determined by measuring a probability density distribution (either theoretically or empirically) indicating the probability of each portion of the model being occluded by the nozzle, then thresholding this distribution to obtain a region of high probability of occlusion.

Figures 4A, 4B:
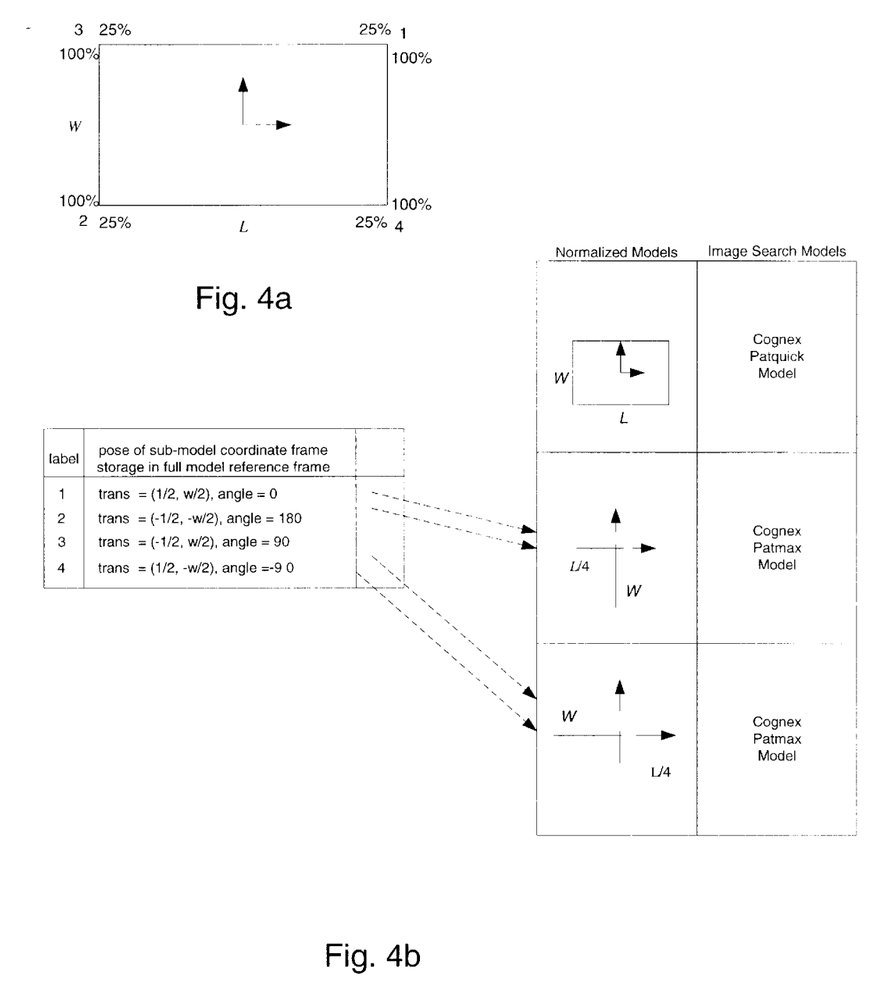
Figure 5:
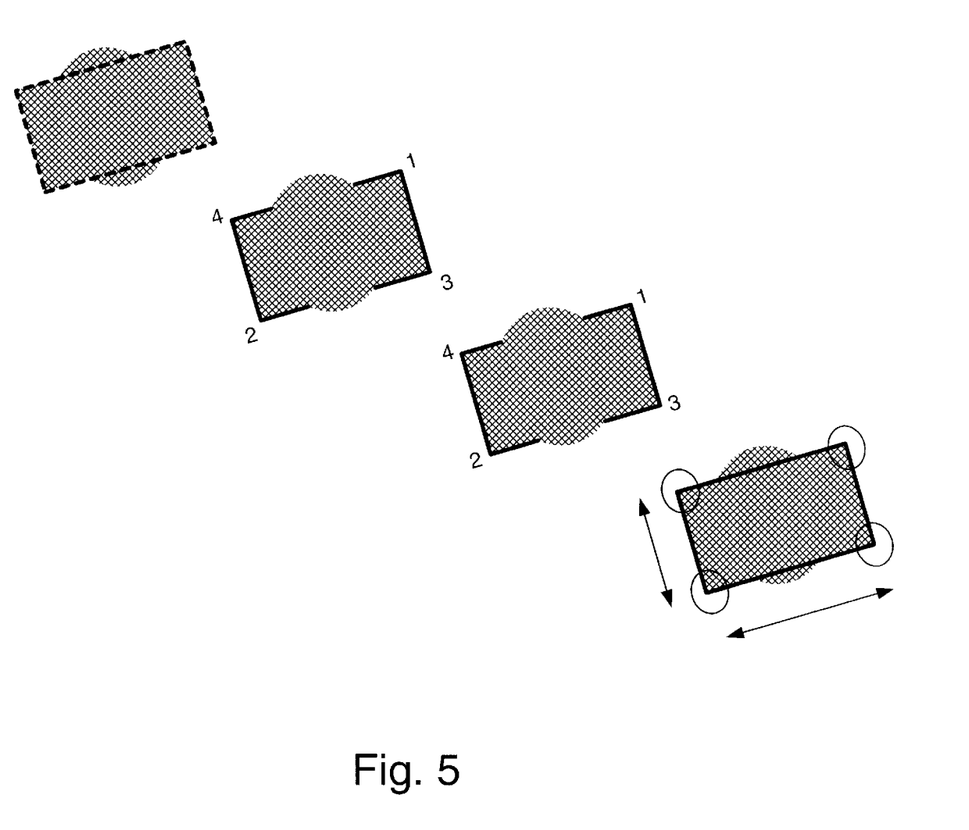
FIG. 5 schematically illustrates the relationship of a chip and a nozzle during a typical pickup operation.
Figure 6:
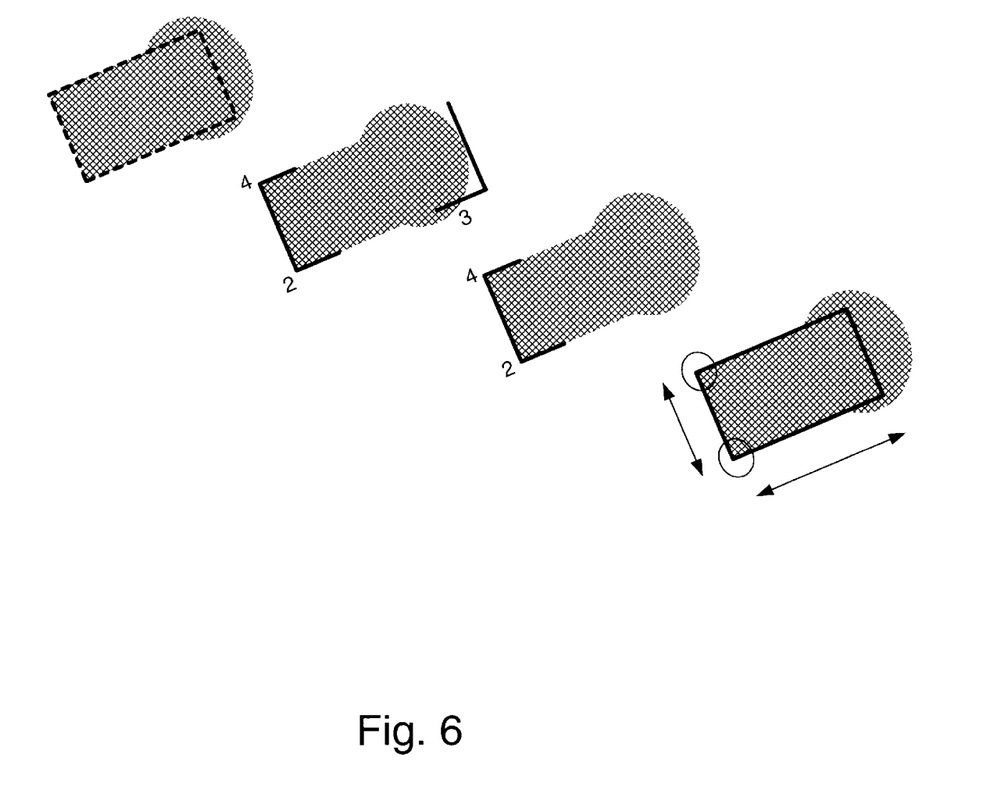
FIG. 6 schematically illustrates the relationship of a chip and a nozzle during an "end" pickup operation.
Figure 7:
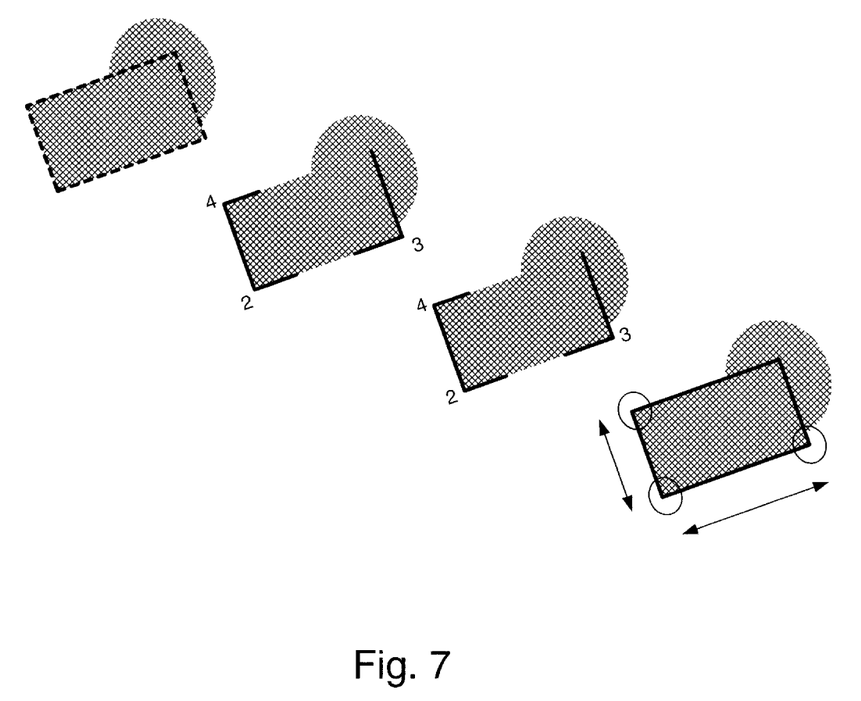
FIG. 7 schematically illustrates the relationship of a chip and a nozzle during a "corner" pickup operation.

Referring to FIG. 4a, next, the percentages of the segments connected to each vertex of any particular sub-model (e.g., one of the sub-models labeled 1, 2, 3, or 4) are determined by extending the segments from each vertex until they reach the occlusion region 18. Alternatively, the sub-models may consist of disjoint portions of the segments associated with that vertex, where those disjoint portions are determined by masking those segments by the occlusion region. Note that each vertex in the full model is usually assigned a unique label, thereby creating four sub-models. For a chip with nominal length equal to twice the nominal width, and no corner rounding, picked up by a nozzle with a nominal diameter of approximately 70% of the nominal chip length, this method results in a decomposition of the chip into four overlapping sub-models, each including a single overlapping L-shaped "corner shape", as shown in FIG. 4a.

Given the model specification 16 as described above, the step of training the Sub-Model Based Shape Finder Tool 20 progresses in the manner described in the co-pending patent application Ser. No. 09/054,968, filed Apr. 3,1998, incorporated herein by reference. The client provides the sub-sample factor 22 that will be used to train the full model and subsequently run the coarse part location (CPL) phase of the sub-model based shape finder tool, as well as the calibration transformation 24. Note that this training usually results in two normalized, shared "corner shapes" and their respective search models, as illustrated in FIG. 4b. Typically, a coarse search model, such as a low-resolution normalized correlation search model, or a PATQUICK search model, as sold by Cognex Corporation, is trained for the full model, and fine search models, such as fine-resolution normalized correlation search models, or PATMAX models are trained for each of the sub-model descriptions. When training image search models for the sub-models, any corner rounding is typically modeled explicitly rather than ignored.

Following the training phase 20, both the CPL and FPL phases of the sub-models based shape finder tools are run 26 on an image of the chip supplied by the client, as described in the co-pending patent application Ser. No. 09/054,968, filed Apr. 3, 1998. The client supplies the translation, rotation, angular, and aspect uncertainties 28 of the chip (the uncertainty ranges for other degrees of freedom are usually assumed to be negligible). Note that the translation uncertainty is typically specified implicitly by providing only a region of interest (ROI) of the run-time image. Furthermore, the rotational uncertainty can be decreased dramatically (thereby increasing the speed of the CPL phase) by first running a coarse angle finding tool 30 on the image, such as the Cognex Angle Finder tool.

The client also provides 32 the translational and rotational uncertainty for each of the sub-models (again, the uncertainties for other degrees of freedom are assumed to be negligible). Typically, these uncertainties are on the order of a few pixels and a few degrees, respectively.

Note that the final fit degrees of freedom are not important here, since the final pose will be ignored by the tool (as are any errors resulting from the final fit).

Assuming that an error has not occurred when running the shape-finder tool 26 (see the co-pending patent application Ser. No. 09/054,968, filed Apr. 3, 1998, for a description of such errors), the Sub-Model Validator 34 then employs the methods for validating sub-models and refining the model pose as described in the co-pending provisional patent application Ser. No. 60/080,682, filed Apr. 3, 1998, incorporated herein by reference.

The inter sub-model checks performed in the Sub-Model Validator step 34 include discarding those sub-models found with low search scores (anything lower than 0.5, for example, when using the Cognex Patmax tool as the underlying search model), for example, and those sub-models that have high RMS fit errors (the threshold for whichdepends on the application).

Intra sub-model checks include discarding sub-models based on deviation between their found pose in client space and their expected pose according to the CPL model pose 36 provided by the sub-model based shape finder tool 26 (the deviation thresholds can vary with the application, but typical values are 5 degrees for angular deviation, and 4 pixels for translational deviation). Sub-models are also discarded if, when removed, the skew in the pose substantially decreases.

An error is then signaled if at least two sub-models do not remain on at least one of the left or right sides of the chip (where lengthwise is defined as left to right).

Next, a new pose 38 is determined by refitting. A 6 DOF fit is computed (translation, rotation, aspect, scale, and skew) if 3 or 4 sub-models remain. If only two sub-models remain, a 4 DOF fit is computed (translation, rotation, and scale only).

The entire sub-model validation is then repeated if either the final pose 38 differs by more then a specified amount from the CPL pose 36, or if there is a larger than specified skew in the final pose 38.

At this point, the final fit is further verified. In a Boundary Feature Check step 40, the full model (rectangle) description is projected into the image. High contrast boundaries are then detected in the image (for example, by running one of any number of commonly available edge detection tools). If a significant percentage (typically above 5%) of high contrast boundary features are extracted from the interior of the projected rectangle, an error is signaled to the client (usually this means either that what was found was not a chip, or that the chip found in the image has been picked up in a bad orientation by the nozzle).

In the Measure Length & Width step 42, the width of the chip is determined by scaling the nominal chip width provided by the user by the vertical component of the scale in the client space model pose. If three or more sub-models remain after the sub-model validation step (see above), then the length is measured by scaling the nominal chip length by the horizontal component of the scale in the client space model pose.

Next, in the Perform Tolerance Checking step 44, an error will be signaled to the user if the measured width 46 of the chip are not between the minimum and maximum chip widths specified by the client. The same check is performed for the measured length 46, if measured.

Figure 8:
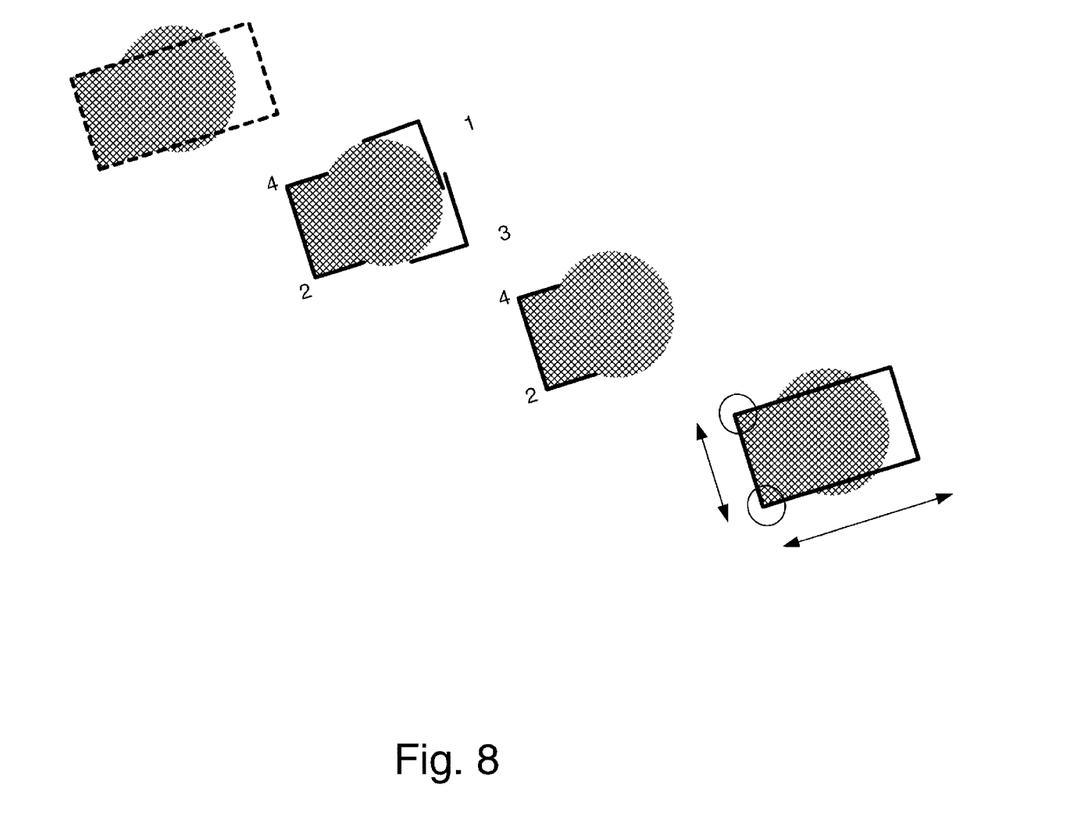
FIG. 8 schematically illustrates the relationship of a chip and a nozzle during a "bad 'tombstone'" pickup operation.

Note that in the bad pickup example of FIG. 8, the final pose results in an error after the feature checking stage 40, since there are a significant number of high contrast boundaries within the found chip outline.

Other modifications and implementations will occur to those skilled in the art without departing from the spirit and the scope of the invention as claimed. Accordingly, the above description is not intended to limit the invention except as indicated in the following claims.

What is claimed is:

1. A method for finding a pattern in an image using a full curvilinear model having a plurality of sub-models, each sub-model including a single vertex and a first and second segment connected thereto, the method comprising:

providing a model having at least two sub-models, two sub-models being in substantially overlapping relationship along most of a first segment of each of the two sub-models, each of the two sub-models also each having a second segment that extends in non-overlapping relationship; and finding the pattern in the image using the model.

2. The method of claim 1, wherein a second segment extends so as not to extend into an occlusion region.

3. The method of claim 2, wherein the occlusion region is enclosed by an occlusion boundary that is defined by an object profile.

4. The method of claim 2, wherein the occlusion region is enclosed by an occlusion boundary is based on empirical statistics and a threshold.

5. A method for finding a pattern in an image using a model having a plurality of sub-models, the method comprising:

providing a model having a plurality of sub-models, each sub-model including a first vertex and a second vertex, a first segment connecting the first vertex and the second vertex, a second segment extending from the first vertex, and a third segment extending from the second vertex, wherein the second segment extends so as not to extend into an occlusion region, and the third segment extends so as not to extend into an occlusion region; and finding the pattern in the image using the model.

6. The method of claim 5, wherein the occlusion region is enclosed by an occlusion boundary that is defined by an object profile.

7. The method of claim 5, wherein the occlusion region is enclosed by an occlusion boundary is based on empirical statistics and a threshold.

8. A method for finding a pattern in an image using a full curvilinear model having a plurality of sub-models, the method comprising:

providing a model having a plurality of sub-models, each sub-model including a first vertex and a second vertex, a first segment connecting the first vertex and the second vertex, a second segment extending from the first vertex, and a third segment extending from the second vertex, the second segment extending so as not to include an occlusion region, and so as to include remaining portions of the second segment, and the third segment extending so as not include an occlusion region, and so as to include remaining portions of the third segment;

finding the pattern in the image using the model.

9. The method of claim 8, wherein the occlusion region is enclosed by an occlusion boundary that is defined by an object profile.

10. The method of claim 8, wherein the occlusion region is enclosed by an occlusion boundary is based on empirical statistics and a threshold.

11. A method for finding a pattern in an image using a full curvilinear model having a plurality of sub-models, each sub-model including at least one vertex of the full model and at least a portion of each segment connected to each vertex, the method comprising:

maximizing the percentage of each segment connected to each vertex; and finding the pattern in the image using the model.

12. The method of claim 11, wherein each sub-model includes exactly one vertex.

13. The method of claim 11, wherein maximizing percentage of each segment connected to each vertex of a sub-model includes including the entirety of each segment.

14. The method of claim 11, wherein maximizing the percentage of each segment connected to each vertex of a sub-model includes incorporating only and all of those portions of segments that lie outside a specified occlusion region.

15. The method of claim 14, wherein the specified occlusion region is enclosed by an occlusion boundary that is defined by an object profile.

16. The method of claim 14, wherein the specified occlusion region is enclosed by an occlusion boundary that is based on empirical statistics and a threshold.

17. The method of claim 11, wherein maximizing the percentage of each segment connected to each vertex of a sub-model includes using only those portions of the segments that extend from a vertex to the boundary of an occlusion region.

18. The method of claim 17, wherein the occlusion region is enclosed by an occlusion boundary that is defined by an object profile.

19. The method of claim 17, wherein the occlusion region is enclosed by an occlusion boundary that is based on empirical statistics and a threshold.

* * * * *